Dec. 15, 1964  D. BUCCICONE  3,161,278
METAL SHEET HANDLING APPARATUS
Filed Nov. 6, 1961  6 Sheets-Sheet 2
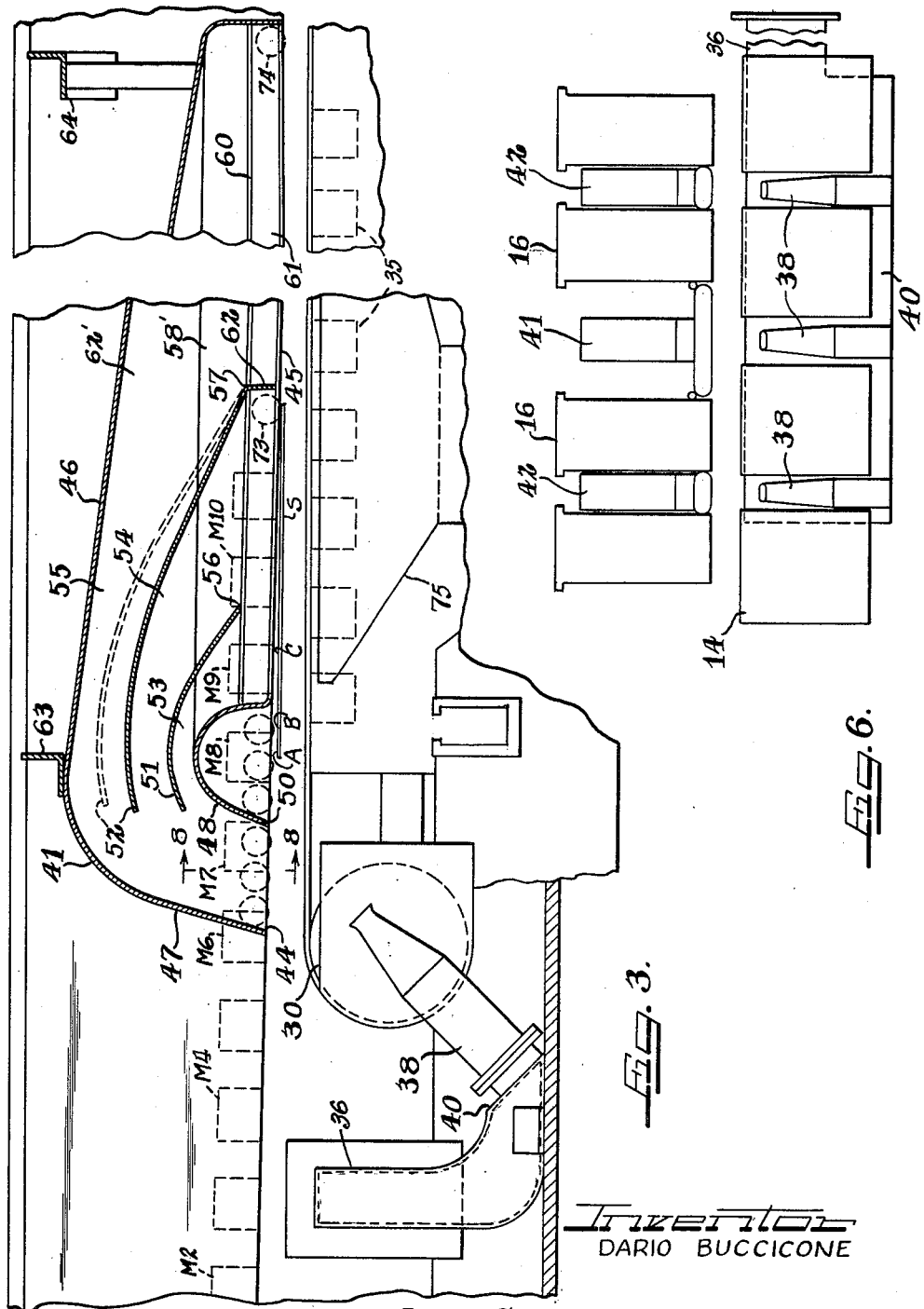
INVENTOR
DARIO BUCCICONE
BY Cromwell, Greist & Warden
ATTYS.

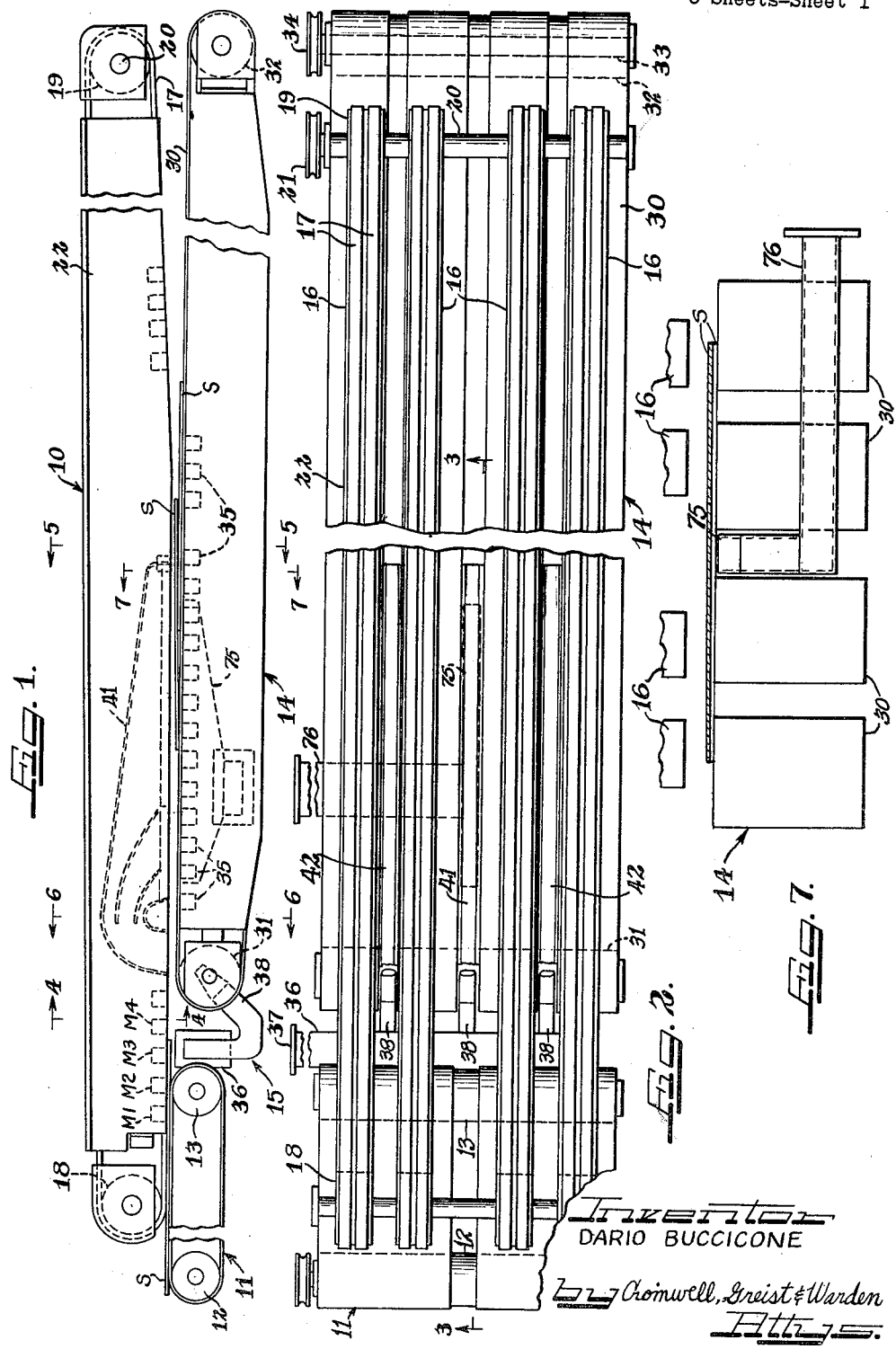

Dec. 15, 1964  D. BUCCICONE  3,161,278
METAL SHEET HANDLING APPARATUS
Filed Nov. 6, 1961  6 Sheets-Sheet 3
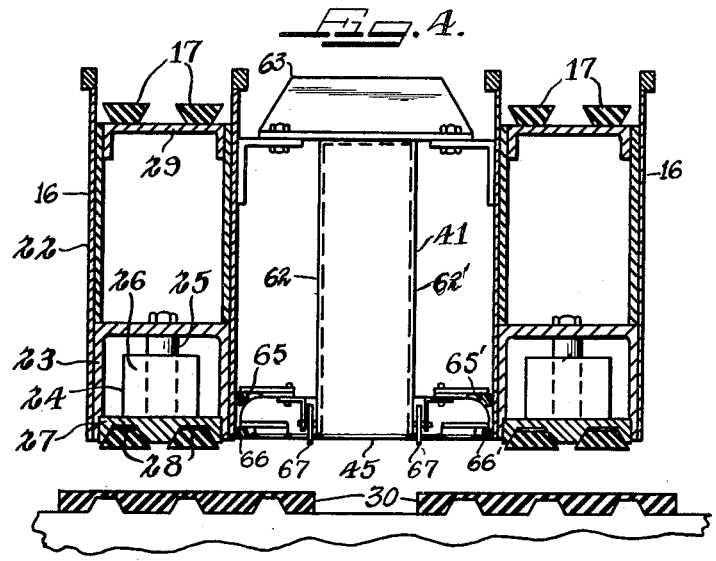
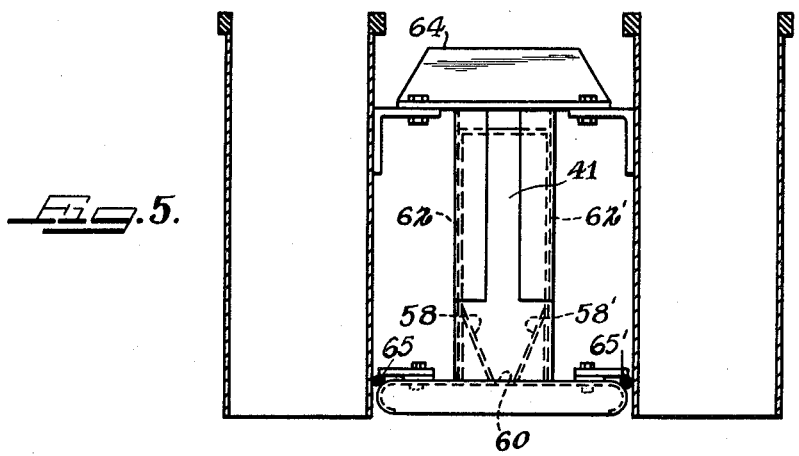
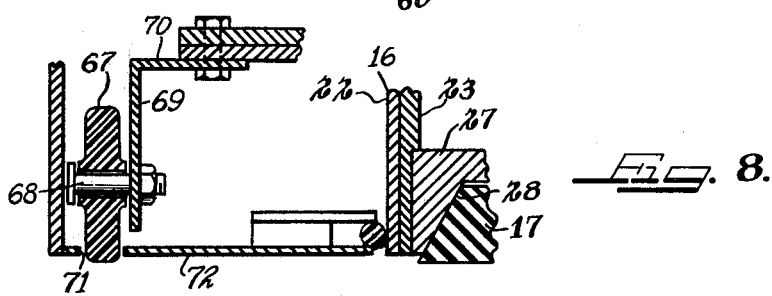
Inventor
DARIO BUCCICONE
by Cromwell, Greist & Warden
Attys.

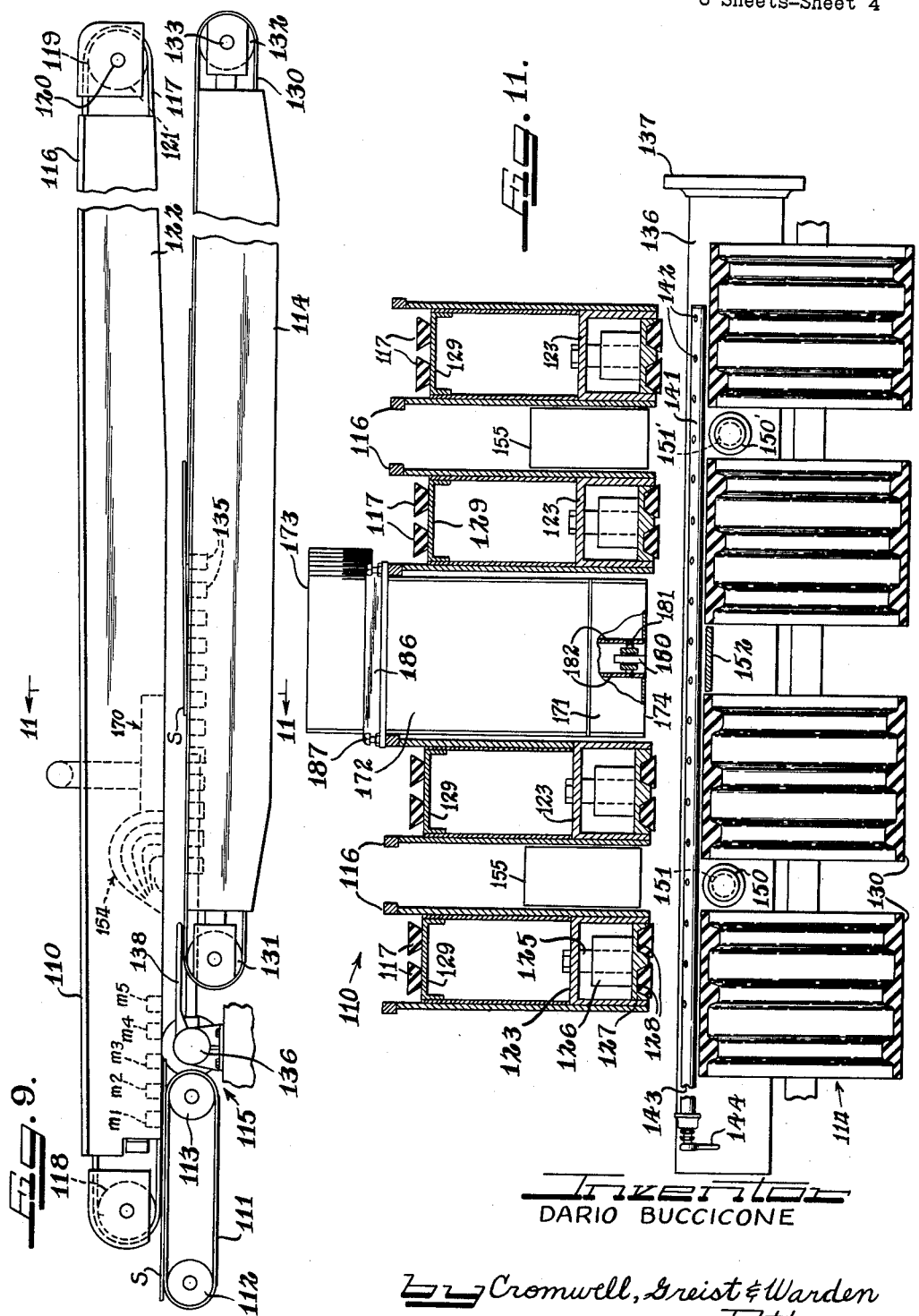

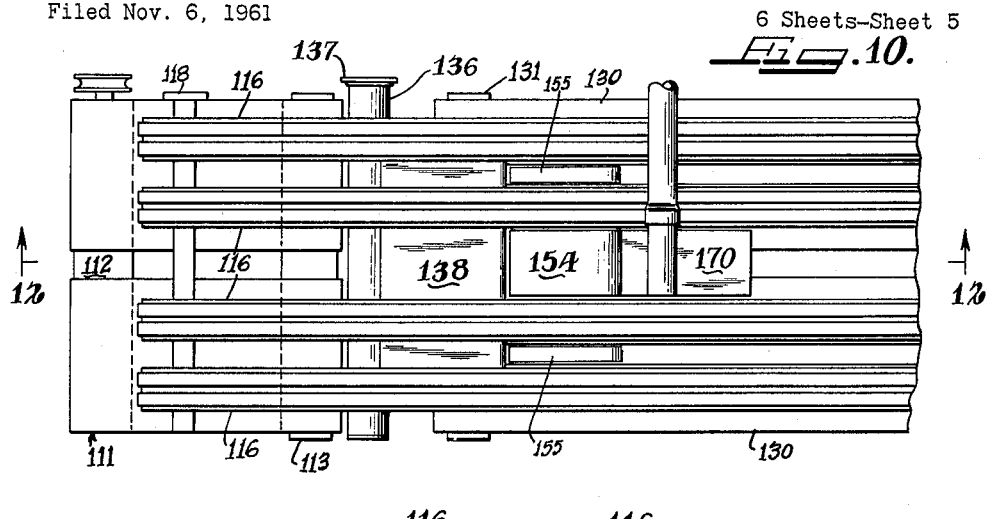
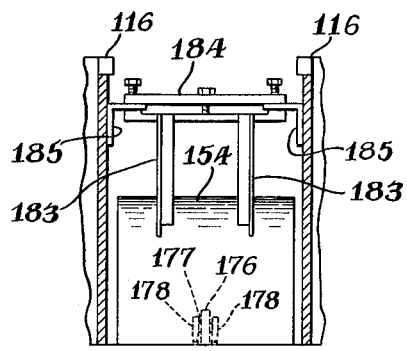
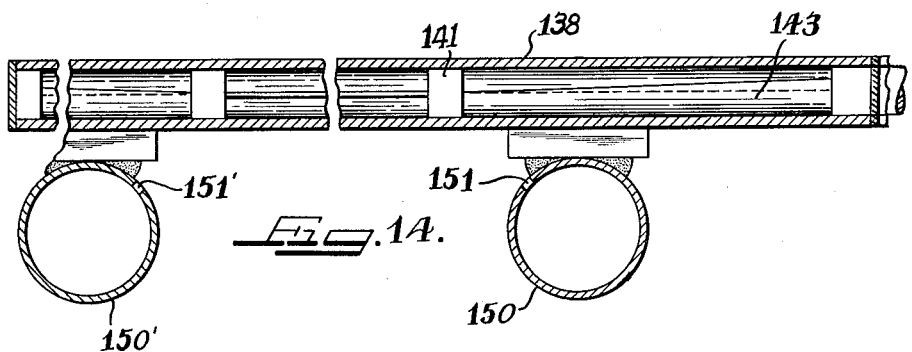

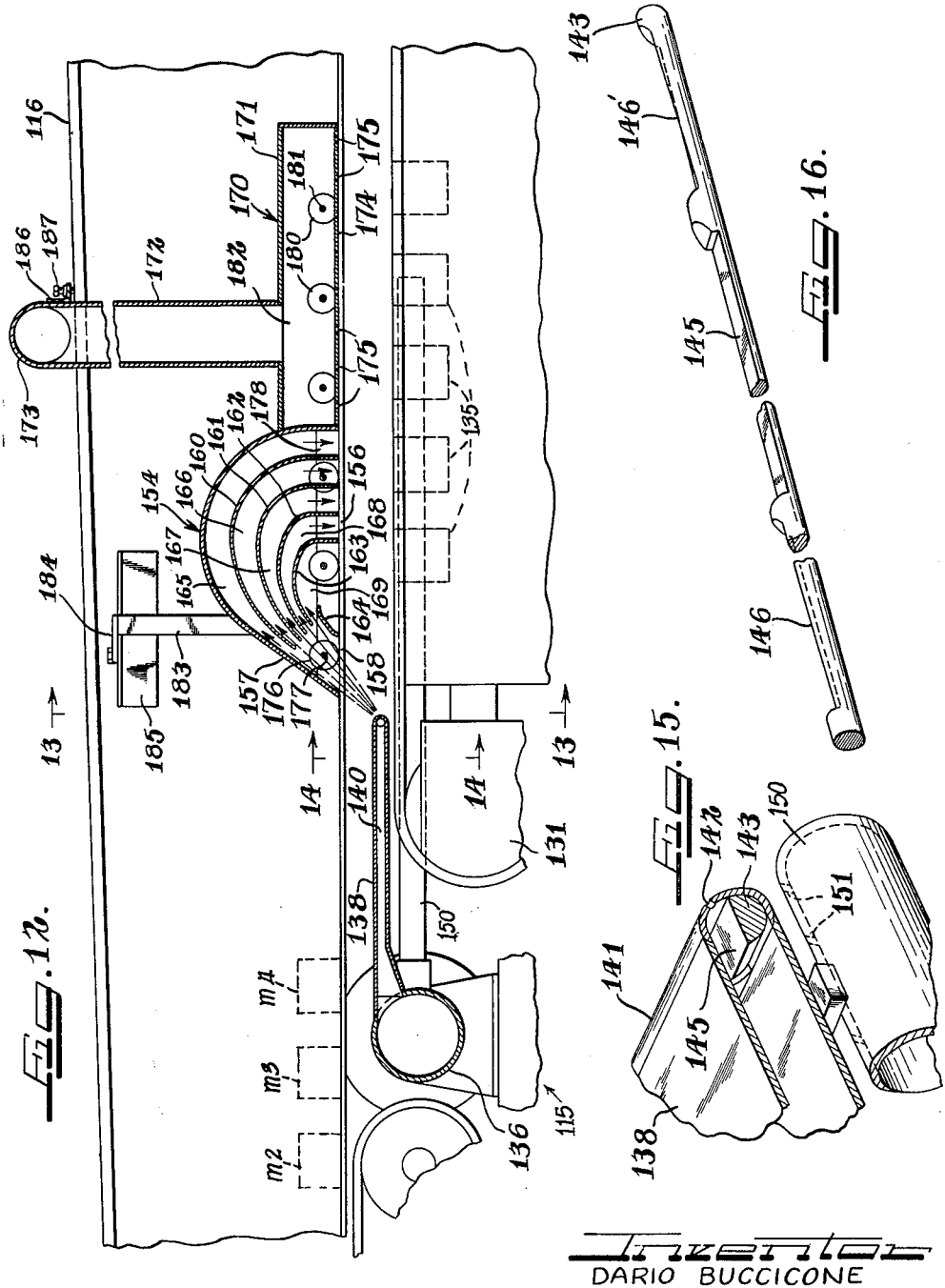

United States Patent Office 3,161,278
Patented Dec. 15, 1964

3,161,278
METAL SHEET HANDLING APPARATUS
Dario Buccicone, Gary, Ind., assignor to Buccicconi Engineering Company, Inc., Gary, Ind., a corporation of Indiana
Filed Nov. 6, 1961, Ser. No. 150,341
17 Claims. (Cl. 198—41)

This invention relates to the handling of metal sheets and is more particularly concerned with improvements in apparatus for controlling the transfer of sheets from an overhead magnetic conveyor to a bottom conveyor which is aligned beneath the overhead conveyor in a high speed processing line.

In the handling of metal sheets in a processing line conveyors employing spaced electromagnets for holding the sheets against a traveling belt are frequently employed. Conveyors of this type are shown in my Patents Nos. 2,642,174, dated June 16, 1953; 2,527,911, dated October 31, 1950; and 2,847,111; dated August 12, 1958.

It is the usual practice to control the current delivered to the electromagnets in such conveyors by suitable switching arrangements so that the magnetic force acting on the sheets may be reduced or cut off to release the sheets for discharge from the conveyor. Due to the high speed with which the sheets are delivered by the shear to the processing line, one common conveying arrangement involves delivering the sheets from a fast moving overhead conveyor in the processing line to a slower moving bottom lapping conveyor so that the sheets may be advanced at a lesser rate of speed for deposit in a piling box or for other processing operations. While control of the magnetic force operative on the sheets through magnet switching or control of the current to the magnets has proven to be satisfactory for long sheets, it is necessary to reduce the speed of operation when handling short sheets because the switching time of the magnets is too long. Consequently, it has been suggested that other arrangements be devised for handling the sheets so as to avoid the reduction in the speed of operation. One such arrangement involves the use of air to overcome the pull of the magnets in the overhead conveyor so as to release the sheets and properly deposit them on the bottom lapping conveyor and it is a general object of the present invention to provide an improved method and apparatus of this type for transferring sheets from a fast moving overhead magnetic type conveyor to a slower moving lapping conveyor beneath the same wherein switching control of the current delivered to the magnets in the overhead conveyor is supplemented by air currents which are operative on the sheets as they are fed to the overhead conveyor and advanced beneath the same to a point where they are transferred to the lapping conveyor.

It is a more specific object of the invention to provide a sheet handling apparatus wherein the successive sheets are advanced by an overhead magnetic conveyor for delivery to a bottom lapping conveyor aligned beneath the same and wherein provision is made for releasing the sheets from the overhead conveyor so that the back edge of each sheet drops before the front edge drops whereby the sheets are dropped onto the lapping conveyor in overlapped relation without causing any appreciable shifting of the sheets which would result in scratching or otherwise damaging overlapped portions of the sheets.

It is a further object of the invention to provide an apparatus for transferring metal sheets from an overhead rail type magnetic conveyor to a bottom lapping conveyor wherein a device is arranged for cooperation with the overhead conveyor which delivers a stream of air upwardly and forwardly of the path of movement of the sheet so that it is effective to support the sheet until the sheet passes the air stream and thereafter the air is directed onto the top of the sheet with sufficient force to release the sheet from the influence of the magnets and allow the same to drop onto the bottom lapping conveyor.

It is another object of the invention to provide in a sheet handling machine wherein metal sheets are transferred from a fast traveling overhead magnetic conveyor to a slower traveling bottom lapping conveyor apparatus for directing a stream of air against the lower face of a sheet as it is fed to the overhead conveyor so that it is effective to support the sheet without interference with its forward movement until it passes the air stream and for thereafter controlling the air stream so that it applies pressure in pre-selected areas on the top of the sheet and is effective in releasing the sheets from the influence of the magnets, thereby permitting the sheet to drop onto the bottom lapping conveyor.

It is still another object of the invention to provide in a piling machine of the type described an air apparatus which comprises an air nozzle positioned for directing a stream of air in an upwardly and forwardly inclined path beneath the path of the sheets at the entrance end of the overhead conveyor and means forming compartments arranged above the path of the sheets which are equipped with adjustable baffle members adapted to downwardly deflect the air delivered by the nozzle from an entrance forming end of the compartments to discharge apertures at spaced points along the path of the sheet so as to exert downward pressure in predetermined areas on the sheet when the trailing end of the sheet advances beyond the nozzle.

It is a further object of the invention to provide an apparatus of the type described which includes an arrangement for withdrawing air from beneath the sheet as it is dropped onto the bottom lapping conveyor with air pressure applied to the top surface thereof.

Another object of the invention is to provide improvements in a piling apparatus of the type shown in my Patent No. 2,897,952, granted August 4, 1959, for Metal Sheet Handling Apparatus.

A further object of the invention is to provide a sheet handling apparatus comprising an overhead conveyor having fast traveling belts and spaced electromagnets for holding the sheets by magnetic force on the lower run of the belts, a slower moving bottom conveyor on which the sheets are deposited, an apparatus at the entrance end of the bottom conveyor for delivering one or more jets of air into a stream which moves at an upward and forward inclination across the path of the sheets, a deflector box associated with the overhead conveyor having bottom openings for receiving the air at the trailing end of a sheet advances beyond the air jets and baffles for dividing the air stream and deflecting the air through a plurality of passageways to bottom openings where it strikes the top surface of the trailing end of the sheet and causes the same to drop before the leading end thereof when the magnetic force is discontinued.

A still further object of the invention is to provide a sheet handling apparatus of the type described wherein a vacuum box with bottom openings is disposed in advance of the air deflector box so as to supplement the magnetic force in holding the front end of the sheet against the belts until the back end is released whereby the latter is freed to drop before the leading end of the sheet.

These and other objects and advantages of the invention will be apparent from a consideration of the method and apparatus which is shown by way of illustration in the accompanying drawings wherein:

FIGURE 1 is a side elevation, partially schematic, of a sheet handling apparatus having incorporated therein the principal features of the invention;

FIGURE 2 is a plan view, with portions broken away, of the apparatus shown in FIGURE 1;

FIGURE 3 is a longitudinal section, on an enlarged scale, taken on the line 3—3 of FIGURE 2, with portions broken away and other portions omitted;

FIGURE 4 is a partial cross section, on an enlarged scale, taken on line 4—4 of FIGURE 1, with portions omitted;

FIGURE 5 is a partial cross section, on an enlarged scale, taken on the line 5—5 of FIGURE 1, with portions omitted;

FIGURE 6 is a cross section, on an enlarged scale, taken on the line 6—6 of FIGURE 1, with portions omitted and other portions shown schematically;

FIGURE 7 is a fragmentary cross section, on an enlarged scale, taken on the line 7—7 of FIGURE 1, with portions shown schematically;

FIGURE 8 is a fragmentary section taken on the line 8—8 of FIGURE 3 to an enlarged scale;

FIGURE 9 is a side elevation, partially schematic, of another form of sheet handling apparatus which incorporates therein the principal features of the invention;

FIGURE 10 is a partial plan view with portions broken away of the apparatus shown in FIGURE 9;

FIGURE 11 is a cross section taken on the line 11—11 of FIGURE 9 to an enlarged scale and with portions broken away or omitted;

FIGURE 12 is a partial longitudinal section taken on line 12—12 of FIGURE 10 to an enlarged scale;

FIGURE 13 is a fragmentary cross section taken on the line 13—13 of FIGURE 12, to an enlarged scale;

FIGURE 14 is a fragmentary cross section taken on the line 14—14 of FIGURE 12, to an enlarged scale, and with portions broken away;

FIGURE 15 is a fragmentary perspective showing a portion of the air apparatus; and FIGURE 16 is a perspective view, with portions broken away, of the air nozzle control rod.

Referring to FIGURES 1 and 2 of the drawings, there is illustrated an apparatus for handling metal sheets which embodies the principal features of the present invention. In the apparatus shown the sheets S are delivered from a high speed processing line to an overhead magnetic conveyor 10 on a feeding conveyor 11, the latter being positioned at the entrance or receiving end of the conveyor 10 and comprising endless belts supported on the driven pulley 12 and the idler pulley 13. The sheets S are advanced by the overhead conveyor 10 above a bottom lapping conveyor 14 which is arranged with its receiving end spaced somewhat in advance of the delivery end of the feed conveyor 11 in the direction of travel of the sheets. The sheets are freed in succession from the lower run of the overhead conveyor 10 and deposited on the upper run of the bottom lapping conveyor 14 in lapped relation by operation of an air apparatus, indicated at 15.

The overhead conveyor 10 is formed of a plurality of magnetic rail units 16 which are arranged in laterally spaced, parallel relation, four of the units being illustrated in the particular arrangement provided. The exact number of the rail units 16 will depend upon the width of sheet which is to be handled by the machine and the type of unit. The rail units 16 are of the type disclosed in my Patent Nos. 2,527,911 and 2,642,174. Each rail unit 16 comprises a pair of belt members 17 (FIGURES 1, 2 and 4) arranged on the end pulleys 18 and 19, the former being an idler pulley and the latter being a driven pulley which is mounted on a cross shaft 20 having a drive pulley 21 at the one end thereof for connection with a suitable source of power. The belt carrying pulleys 18 and 19 are supported at opposite ends of the frame 22 of the unit, the latter being of generally rectangular cross section and extending vertically and longitudinally above the bottom conveyor 14. The frame 22 carries a downwardly opening bottom channel 23 which forms a box for the electromagnets 24, each of which comprises a pole piece 25 and a coil 26. A belt guide 27 spans the bottom side of the magnet box 23 and has parallel longitudinally extending recesses 28 in its bottom face for receiving the belts 17. A top channel 29 supports the return run of the belts. The electromagnets M1, M2, M3 etc. are spaced lengthwise of the box 23 and the coils are connected to a suitable source of current with switch controls being provided for controlling the operation of the electromagnets.

The lower or bottom lapping conveyor 14 is preferably of the broad belt type such as disclosed in my Patent No. 2,847,111, dated August 12, 1958. It comprises sheet supporting belt 30 (FIGURES 1, 2 and 4) carried on end pulleys 31 and 32 which are suitably mounted on a supporting framework. The pulley 31 at the receiving end is an idler pulley while the pulley 32 at the discharge end is supported on a cross shaft 33 which has a drive pulley 34 mounted at one end for connection to a suitable source of power for driving the conveyor. The conveyor 14 includes a series of longitudinally spaced magnet units indicated at 35 which are supplied with current from a suitable source. The magnets 35 which are adjacent the receiving end of the conveyor 14 are of greater strength and are more closely spaced than the magnets at the discharge end of the conveyor so that the magnetic force acting on the sheets is greatest at the point where they are first dropped onto the conveyor 14 and any shifting of the sheets is avoided.

The air apparatus 15 comprises an air tank 36 (FIGURES 1, 2, 3 and 6) which extends transversely of the apparatus between the discharge end of the feed conveyor 11 and the receiving end of the bottom lapping conveyor 14. The tank 36 has an inlet connection 37 for receiving a pipe or other conduit to connect the same to an air supply device, preferably a fan (not shown). The air tank 36 is provided with nozzles 38 which extend at an upward inclination of approximately 45° between the pulleys 31 of the bottom lapping conveyor units. The nozzles 38 are spaced laterally of the apparatus and extend from a forward section 40 of the tank 36. The nozzles 38 are positioned so as to direct a steam of air between adjacent rail units 16 of the conveyor 10 as shown in FIGURES 2 and 6.

The air is delivered across the path of movement of the sheets S and into deflector boxes 41 and 42 (FIGURES 1, 2, 3 and 6) mounted between the rail units 16. In the illustrated arrangement, deflector box 41 is positioned in the center of the conveyor 10 and a deflector box 42 is positioned between each of the two pairs of conveyor rail units 16. Each deflector box has an air inlet opening 44 in the bottom face and at the trailing end thereof which is positioned immediately above a nozzle 38 so as to receive air from the nozzle when there is no obstruction between this opening and the discharge end of the nozzle. The deflector boxes 41 and 42 are constructed in an identical manner except for the width of the base which is made the proper dimensions to fill the space between the adjoining conveyor units 16. Each of the deflector boxes is shaped as illustrated in FIGURES 3, 4 and 5 with its bottom wall 45 in a plane extending slightly above the bottom of the adjacent rail units 16. The top wall 46 is inclined from the trailing end to the leading end so that the volume of the box is reduced towards the latter end. At the trailing end the top wall 46 curves downwardly and merges with an upwardly and forwardly inclined rear end wall 47, the latter terminating at its lower edge at the air receiving opening 44. The opening 44 is divided by a partition forming wall member 48 which has a reverse curvature giving it a generally semi-circular cross section and providing a relatively shallow downwardly opening pocket as shown in FIGURE 3. The trailing edge of the plate 48 is positioned at a point 50 which is approximately in the axial line of the nozzle 38 so that the stream of air delivered by the nozzle 38 is split or halved by the trailing edge of the partition 48 with half of the steam being directed into the main body of the box and the other half of the steam being deflected immediately by the recurved portion of the partition 48 onto the top of the trailing end of the sheet S.

The main body of each deflector box is divided by two baffle members 51 and 52 (FIGURES 3 and 5) which have their trailing edges positioned above the member 48 and which divide the main body of the box into three compartments 53, 54 and 55. Compartment 55 extends to the leading end of the box and the compartments 53 and 54 terminate at predetermined distances from the entrance aperture 44. The baffle or deflector plate 51 is fixed in position and terminates at the point 56 while the deflector plate 52 is adjustable in the box and swings about the line or point 57 at the leading end thereof. Each box is provided with a pair of cooperating longitudinally extending trough forming plates which are indicated at 58 and 58' in the center box 41 and which are disposed in downwardly converging relation throughout the length of the box with their bottom edges separated to form a discharge slot 60 which communicates with a downwardly opening bottom compartment 61, the latter being formed by bent plates which extend, as shown in FIGURE 5, outwardly of the side wall plates 62 and 62' of the box. The bottom compartment 61 is closed at its opposite ends and divided by a cross partition 62 into two air receiving chambers. Other cross partitions may be employed to further divide the compartment 61 so as to provide any number of air chambers in which air pressure may build up while the bottom of the chamber is closed by a plate S held on the conveyor belts.

The center air deflector box 41 is supported at its trailing end by securing the top wall to the cross member of a bracket 63 which is in turn secured to the side walls of the adjacent conveyor units. At its leading end it is secured between upright angle members forming with a top cross piece a bracket 64 which is in turn secured to the side walls of the adjacent conveyor units 16. The bottom compartment 61 has its side edges sealed by suitable gaskets 65 and 65' (FIGURE 4) to the vertical side walls of the adjacent rail units 16 so as to prevent escape of air from the air accumulating chambers while a plate S closes the bottom opening. Suitable gaskets 66 and 66' are positioned between the sides of the trailing end of the deflector box and the adjacent conveyor walls so as to seal around the opening 44 and prevent loss of air at this end of the box.

Wheel members 67 (FIGURES 4 and 8) may be provided at the trailing end of the box 41 which are supported on shafts 68 extending from the vertical flanges 69 of angle bracket members 70 which are arranged at opposite sides of the air entrance 44. The wheels or rollers 67 extend slightly below the box bottom through apertures 71 in the bottom plate 72 of the deflector box but are not quite even with the bottom of the belts 17 of the adjoining conveyor units 16 against which the top surface of the metal sheets is engaged. The wheels 67 are provided to support relatively thin sheets which have a tendency to be bent upwardly when subject to the air pressure from the nozzles 38. One or more additional plate supporting wheels or rollers 73 and 74 may be mounted at points along the box 41 to insure that the sheet does not drag on the bottom of the box. These wheels may be omitted when the apparatus is used to handle heavy sheets.

In order to relieve any accumulation of air which may interfere with the deposit of the sheets on the lapping conveyor 14 an air return trough 75 (FIGURES 1, 2, 3 and 7) is provided which extends between the two middle conveyor units in the bottom lapping conveyor 14. The air trough 75 is connected by a laterally extending conduit 76 with the blower intake (not shown). This provides for the removal of any air which may accumulate under the sheet and renders the magnets more effective in holding the sheet down to the conveyor belt.

In operating the apparatus, the electromagnets $m-1$ etc. are supplied with current sufficient to produce an electromagnetic force which will attract the sheets S and pull them against the lower runs of the belts 17 for advance by the conveyor 10 above the bottom lapping conveyor 14. The sheets S are delivered by the feed conveyor 11 to the entrance end of the conveyor 10 where they are gripped by the first electromagnets $m-1$, $m-2$ etc. As the trailing end of each sheet S passes the openings 44 in the trailing ends of the boxes 41 and 42 a stream of air is delivered by each nozzle 38 into its associated deflector box 41 or 42 where it is divided by the baffle plates 48, 51 and 52 and directed forwardly and downwardly onto the top surface of the sheets. The air passes through the passageways or compartments 53, 54 and 55 and through the discharge slot 60 into the accumulating chambers in the bottom of the box, so that it impinges on the uppermost surface of the sheet S and applies sufficient pressure on the sheet to overcome the force of the magnets, causing the sheet to drop onto the bottom conveyor 14. The strongest pressure points are indicated at A, B and C on FIGURE 3. The baffle 52 may be adjusted to vary the amount of air delivered through the compartments 54 and 55. Generally, the magnets $m-1$ to $m-6$ inclusive will be permanently magnetized while magnets $m-7$, $m-8$ and $m-9$ will be weakened or completely off and magnets beyond M9 will be energized but weakened.

The nozzles 38 are set at an angle so that the air stream is directed upwardly and also in the direction of sheet travel which tends to support the sheet without any resistance to the forward movement of the sheet. In the illustrated form of the apparatus, three nozzles 38 are provided. However, the number of nozzles may be varied depending upon the width of the conveyor and when narrow sheets are handled the outside nozzles may be closed and the center nozzle only allowed to operate.

Another form of the apparatus is shown in FIGURES 9 to 16 which also incorporates the principal features of the invention. In this form of the apparatus the sheets S are delivered from a high speed processing line to an overhead magnetic conveyor 110 on a feeding conveyor 111. The feeding conveyor 111 is positioned at the entrance end of the conveyor 110 and comprises endless belts supported on the driven pulley 112 and the idler pulley 113. The sheet S are advanced by the overhead conveyor 110 above a bottom lapping conveyor 114 which is mounted on suitable end frames (not shown) with its entrance end being spaced somewhat in advance of the delivery end of the feed conveyor 111 in the direction of travel of the sheets. The sheets S are freed in succession from the lower run of the overhead conveyor 110 and deposited on the upper run of the bottom conveyor 114 in lapped relation with the help of an air apparatus indicated at 115.

The overhead magnetic conveyor 110 is formed of a plurality of electromagnetic conveyor rail units 116 which are arranged in laterally spaced parallel relation, four of the units being shown in the particular arrangement illustrated. The rail units 116, which are of the type previously described, each comprise a pair of belt members 117 (FIGURE 11) arranged on the longitudinally spaced end support pulleys 118 and 119 (FIGURES 9 and 10). The pulley 119 is mounted on a cross shaft 120 having a drive pulley 121 at the one end thereof for connection with a suitable source of power. The belt carrying pulleys 118 and 119 are mounted at opposite ends of the frame 122 of the unit, the latter being of generally rectangular cross section and extending vertically and longitudinally above the bottom conveyor 114. The conveyor frame 122 carries a downwardly opening bottom channel member 123 which forms a box for the electromagnets which are indicated at m–1, m–2 etc. in FIGURE 9. Each of the electromagnets comprises a pole piece 125 and a coil 126. A belt guide 127 spans the bottom side of the magnet box 123 and has parallel, longitudinally extending recesses 128 in its bottom face in which the belts 117 are seated. A top channel 129 supports a return run of the belts 117. The electromagnets m–1, m–2, m–3 etc. are spaced lengthwise of the box 123 and the coils 126 are connected to a suitable source of current with switch controls being provided for controlling the amount of current delivered to each of the electromagnets so as to control the operation thereof.

The lower or bottom lapping conveyor 114 is preferably of the broad belt type, as disclosed in my Patent No. 2,847,111, dated August 12, 1958. It comprises sheet supporting belt 130 (FIGURES 10 and 11) carried on end pulleys 131 and 132 which are suitably mounted on a supporting framework (not shown). The pulley 131 at the entrance end of the conveyor 114 is an idler pulley while the pulley 132 at the other end is supported on the cross shaft 133 which has a drive pulley (not shown) mounted at one end for connection with a suitable source of power. The conveyor 114 includes a series of longitudinally spaced electromagnets, indicated at 135, which are supplied with current from a suitable source. The electromagnet 135 which are adjacent the entrance end of the conveyor 114 are of greater strength and more closely spaced than those at the discharge or leading end of the conveyor so that the magnets force acting on the sheet is greatest at the point where they are first dropped on the conveyor 114 and longitudinal shifting of the sheets is avoided.

The air apparatus 115 comprises an air tank 136 (FIGURES 9, 10, 11 and 12) which extends transversely of the conveyors between the discharge end of the feed conveyor 111 and the entrance end of the bottom lapping conveyor 114. The tank 136 has an inlet connection 137 for receiving a pipe or other conduit to connect the same to an air supply device, preferably a fan (not shown). The air tank 136 is provided with a nozzle formation 138 (FIGURES 12, 14, 15 and 16) which extends forwardly of the tank 136 in a horizontal direction and terminates at a point beyond the belt supporting pulleys 131 of the lower lapping conveyor 114. The nozzle 138 is in the form of a relatively wide, thin tank providing an air passageway or compartment 140 of rectangular cross section. The forward end of the nozzle formation 138 is formed by a cross tube 141 which extends across the entire width at the end edge of the nozzle 138 and which has portions of its side wall cut away so as to provide communication with the chamber 140. The cross tube 141 is provided with a series of air holes 142, which holes 142 are drilled so as to direct air moving from the chamber 140 into the tube 141 upwardly and forwardly at an angle of approximately 45°. The holes 142 are spaced in the tube 141 so as to extend across the end of the chamber 140 and provide for a series of air jets which are directed upwardly in the direction of the upper conveyor rail units 116 and forwardly in the direction of travel of the sheets S. The air holes 142 in the pipe 141 are opened and closed by means of a valve forming rod 143 (FIGURES 11, 14, 15 and 16) which is rotatably mounted in the pipe 141 with one end thereof extending through a suitable bearing at one end of the pipe and provided with an operating handle member 144 which enables the operator to rotate the same. The valve rod 143 has cut away portions 145 in the center and 146, 146′ at opposite ends so as to control the delivery of air through the holes 142. The portion 145 at the center of the rod 143 is cut away uniformly so that all the holes in the center of the pipe 141 are opened and closed at the same time when the rod is rotated. The portions 146 and 146′ at opposite ends of the rod 143 are cut away with a spiral taper so that the holes 142 at the extreme end can be closed first as the rod 143 is rotated and adjacent holes closed successively, by further rotation of the rod 143. This enables the air jets or streams which are delivered through the holes 142 to be controlled in accordance with the width of the sheet which is being handled, all the holes being held open when the sheet is wide enough to cover all of them and the end holes being closed when the sheet does not extend to the same.

In addition to the nozzle formation 138 the air apparatus includes a pair of forwardly extending, horizontally disposed air pipes 150 and 151 which extend from the air tank 136 between the belt 130 of the bottom conveyor 114 as shown particularly in FIGURES 11 and 12. The air pipes 150 and 150′ are identical except for being right and left handed and both of them extend a substantial distance beyond the forward end of the nozzle formation 138. The pipes 150 and 150′ are provided with a series of axially spaced air holes 151 and 151′ which are disposed at an angle to the horizontal so as to direct air upwardly and forwardly at an angle of approximately 45°. The holes 151, 151′ are also inclined at a lesser angle inwardly toward the longitudinal center of the apparatus. The air holes 151 and 151′ are of a size and are spaced so as to deliver sufficient air to help support the front edge of the sheet. Also the air supplied by these two pipes functions as a wall which tends to confine the air movement to the area between the pipes and thereby to keep the sheet from skewing. A baffle plate 152 (FIGURE 11) is mounted between the center belt units 130 which also helps confine the air to the area between the conveyors.

The air holes 142 in the end of the nozzle formation 138 deliver the air jets or streams across the path of movement of the sheets S and into deflector boxes 154 and 155 which are mounted between the rail units 116 (FIGURES 10 to 13). The center deflector box 154 and the two side boxes 155 may be identical in construction or the two side boxes 155 may be modified somewhat as hereinafter noted. The center deflector box is constructed as shown in FIGURES 11 and 12 with its bottom face 156 in a plane extending slightly above the bottom of the adjacent rail units 116. The top wall 157 is curved as shown in FIGURE 12 so as to deflect downwardly the air which is received through an opening 158 in the trailing end of the bottom face 156 and the box is positioned so that the air streams delivered through the holes 142 in the nozzle end member 141 are received in the bottom opening 158. The trailing portion of the top wall 157 of the box is upwardly and forwardly inclined at an angle of approximately 45° and then curved downwardly so as to direct the air onto the trailing margin of the sheet when the air streams are unobstructed upon movement of the trailing edge of the sheet past the forward end of the nozzle formation 138. The body of the box 154 is divided by baffle or partition forming members 160, 161, 162, 163 and 164 to divide the same into a series of compartments or passageways 165, 166, 167, 168 and 169, with the partitions having a curvature approximating that of the outside top wall 157 so as to direct the air through the passageways to and out of the bottom 156 of the box onto the sheet with the force of the air being greatest at the trailing end of the box and decreasing somewhat in the direction of the leading end of the box.

A vacuum box 170 extends from the leading edge of the deflector box 154 having a bottom portion or section 171 which is rectangular in cross section and of relatively small height, and a connecting upper portion or section 172, also of rectangular cross section approximately the same as that of the lower box 171. The upper section 172 is disposed in upright position and extends above the tops of the conveyor units 116 with a connecting portion 173 adapted to be coupled to a vacuum pump (not shown) or other vacuum source. The bottom wall 174 of the vacuum box is provided with a series of holes 175 for applying suction to the leading portion of the sheets S and so assist the electromagnets in holding the forward end of the sheets raised while the lower trailing end is pushed down and drops free due to the action of the air streams and the deflector boxes 154 and 155.

The deflector box 154 is provided with a series of longitudinally spaced rollers 176 mounted on cross shafts 177 which extend between a pair of parallel, upstanding, longitudinally disposed plates 178 in the bottom of the box with the periphery of the rollers extending slightly below the bottom face 156 of the box so as to ride on the top of the sheet when thin sheets are being piled. Similar rollers 180 are mounted in the bottom portion of the vacuum box 170 on cross shafts 181 extending between a pair of parallel, longitudinally extending, upstanding plates 182 which divide the bottom portion or section 171 of the vacuum box 170 into two longitudinally extending, parallel compartments as indicated in FIGURE 11.

The air deflector box 154 and the vacuum box 170 are supported as a unit between the two center conveyor rail units 116. At the trailing end of the box 154 depending bracket members 183 are attached at their lower ends to the top plate 157 and connected at their top ends to a cross bar 184 which is clamped to angle brackets 185 secured on the side walls of the conveyor rail units 116. The upstanding portion or section 172 of the vacuum box 170 has an angle bar 186 secured thereto which extends at its ends over the top edges of the frames of the conveyor units 116 and is secured thereto by the clamp bolts 187.

In operating the form of the apparatus shown in FIGURES 9 to 16, the coils of the electromagnets m–1 etc. are supplied with current and switch controls are provided which enable the operator to turn the electromagnets on and off in groups or singly and also to supply reduced current so as to weaken the force of the same, as desired. The sheets S are delivered to the overhead conveyor 110 by the feed conveyor 111 where they are pulled against the belts by the force of the first electromagnets m–1, m–2 etc. and carried forward. As the leading end of each sheet S passes the openings 142 in the air nozzle, the air delivered through the openings 142 helps to support the sheet during its advance beneath the air deflector boxes 154 and 155. As the trailing end of the sheet passes the openings 142 in the nozzle 138 the stream of air is delivered into the openings 158 at the trailing end of the deflector boxes where it is divided by the baffle plates 160, 161, 162, 163 and 164 and directed forwardly and downwardly out of the bottoms of the boxes onto the top surface of the sheet along the trailing margins thereof. Prior to the advance of the sheet so as to clear the path of the air into the openings 158 in the deflector boxes the forward or leading end of the sheet is held, partially by suction in the suction box 170, against the belts 117. As the air pressure is exerted on the trailing end of the sheet the strength of the electromagnets is reduced or they are cut off so that the sheet is dropped onto the bottom conveyor 114. The air from the deflector boxes causes downward movement of the trailing end of the sheet and also neutralizes the pull on the sheet exerted by the suction in the suction box 170 thereby freeing the sheet so that the leading end of the sheet is pulled free of the belts 117 and the sheet is allowed to drop onto the conveyor 114 with the trailing end dropping first. The air pipes 150 and 150' deliver a sufficient quantity of air through the openings 151 and 151' to cushion the fall of the sheets onto the conveyor 114 and to prevent them from skewing or turning out of line.

The side air deflector boxes 155 may be identical in construction with the center air deflector box 154 except for width which will depend upon the lateral spacing of the rail units 116. The boxes 155 may be modified to omit the vacuum device 170. Also the boxes 155 may be omitted entirely when real narrow sheets are being handled. If desired, the boxes may be modified to provide a different baffle arrangement depending upon the sheet being handled.

While particular materials and specific details of construction have been referred to in describing the illustrated forms of the invention, it will be understood that variations in materials and different details of construction may be resorted to within the spirit of the invention.

I claim:

1. A method of handling metal sheets of magnetic material in a continuous processing line, which comprises advancing successive sheets in a generally horizontal path to a horizontally disposed overhead magnetic conveyor, directing a stream of air upwardly toward the overhead conveyor in a direction diagonally across the path of advance of the sheets, advancing successive sheets across the stream of air so as to be partially supported thereby, deflecting the stream of air when the sheet has passed the same downwardly onto preselected areas of the top surface of the sheet and controlling the volume of air which is directed downwardly on each of said segregated areas by channeling the air onto said segregated areas whereby downward pressure is applied on the top surface of the sheet in varying degrees along the sheet so as to release the same from the magnetic conveyor at a predetermined position for deposit on a surface beneath.

2. A method of handling metal sheets of magnetic material in a continuous processing line, which comprises advancing successive sheets in a generally horizontal path to a horizontally disposed overhead magnetic conveyor, directing a stream of air upwardly toward the overhead conveyor diagonally across the path of advance of the sheets, advancing successive sheets across the stream of air so as to be partially supported thereby, deflecting the stream of air when the sheet has passed the same downwardly onto preselected areas of the top surface of the sheet, controlling the volume of air which is directed downwardly on each of said areas whereby to apply downward pressure to the sheet so as to release the same from the magnetic conveyor at a predetermined position for deposit on a bottom lapping conveyor and withdrawing air from beneath the sheet as it is deposited on said bottom lapping conveyor.

3. A sheet handling apparatus comprising an elongate overhead conveyor having sheet engaging traveling belts and electromagnets arranged to hold the sheets against the belts, a bottom sheet receiving conveyor below said overhead conveyor, an air deflector box associated with said overhead conveyor and having longitudinally spaced openings in the bottom face thereof for receiving a stream of air at the trailing end and baffle forming partitions therein for directing the air to the openings and for discharging the air downwardly against the sheets in areas in advance of the same, an air nozzle for delivering a stream of air upwardly across the path of travel of the sheets and into an air receiving opening in said deflector box, an air supply device connected to the nozzle, an air receiving box associated with the bottom conveyor and connected with said air supply device so as to withdraw air from beneath the sheets and provide an air flow path which is interrupted by each sheet as it is delivered to the overhead conveyor whereby the air initially supports the sheet and thereafter, when the sheet has passed over the air nozzle, downward pressure and downward suction supplied by withdrawal of air from said air receiving box by said air supply device are applied to the sheet to release the same from the overhead conveyor and hold the sheet on the bottom conveyor.

4. In an apparatus for handling metal sheets, an elongate bottom conveyor, an elongate overhead magnetic conveyor extending in vertically and longitudinally aligned relation above the bottom conveyor for delivering sheets to a position for deposit on the bottom conveyor, an air supply device positioned between the entrance end of the overhead conveyor and the entrance end of the bottom conveyor, an air discharge nozzle connected to said air supply device and positioned to discharge a stream of air at an angle which is upwardly inclined toward said overhead conveyor and in the direction of travel of the sheets, an elongate compartment forming box arranged along said overhead conveyor, said box having an air receiving aperture at the trailing end thereof which is aligned with the air discharge nozzle so as to receive the stream of air from the nozzle, a reversely curved deflector plate extending across said air receiving aperture and dividing the stream of air so as to deflect a predetermined portion thereof onto the trailing marginal portion of the sheet, deflector plates extending longitudinally of said box for dividing the box vertically into a plurality of horizontal compartments forming passageways for the remaining portion of the stream of air, relatively shallow bottom compartments in said box which open downwardly and which receive air from the horizontal compartments whereby the remaining portions of the air stream are directed upon preselected areas of the sheet thereby to distribute the pressure applied by the air stream throughout the length of the sheet.

5. In an apparatus as recited in claim 4, and a pair of side plates extending in downwardly converging relation in said horizontal compartments with their bottom edges spaced to form relatively narrow discharge slots into said bottom compartments.

6. In an apparatus as recited in claim 4, and said bottom compartments extending laterally of the side edges of the deflector box.

7. In apparatus for handling metal sheets, a bottom conveyor, an overhead magnetic conveyor comprising a plurality of relatively narrow, laterally spaced elongate conveyor units extending above the bottom conveyor for advancing successive sheets to a position for release on the bottom conveyor, an air supply device having an upwardly directed air discharge nozzle which is inclined upwardly and in the direction of advance of the sheets for delivering a stream of air diagonally upward across the path of travel of the sheets, and means forming air deflector compartments associated with the overhead conveyor units and having openings forming air receiving and air discharge apertures which are spaced longitudinally of the conveyor, said air receiving apertures being positioned in alignment with the openings in the discharge nozzle, longitudinally extending partition means to divide the compartments so as to deliver the air through separate passageways to the discharge apertures, means in said air passageway which is immediately adjacent the air receiving aperture for immediately reversing the direction of movement of a portion of the air stream received from said air device when a sheet advances past the discharge nozzle and for directing the reversed air stream against the end margin of the sheet so as to exert downward pressure on the trailing end of the sheet for releasing the same from the overhead conveyor.

8. In an apparatus for handling metal sheets, a bottom conveyor, an overhead magnetic conveyor extending in vertically and longitudinally aligned relation above the bottom conveyor for delivering sheets to a position for deposit on the bottom conveyor, said overhead conveyor comprising a plurality of relatively narrow, elongate conveyor units arranged in parallel, laterally spaced relation, an air supply device adjacent the entrance end of the bottom conveyor having a plurality of air discharge apertures, said apertures being spaced laterally so that they are positioned to discharge a stream of air between the conveyor units at an angle which is upwardly inclined in the direction of travel of the sheets, compartment forming boxes arranged between the units of said overhead conveyor, said boxes each having an air receiving aperture at the trailing end thereof which is aligned with an air discharge nozzle so as to receive the stream of air from the nozzle, a reversely curved deflector plate extending across said air receiving aperture and dividing the stream of air so as to deflect a predetermined portion thereof onto the trailing marginal portion of the sheet, air deflector plates in each of said boxes for dividing the remaining portion of the air stream so as to direct the same toward the leading and intermediate portions of the sheet respectively, thereby to distribute the pressure applied by the stream of air in predetermined degrees over predetermined areas of the sheet.

9. A sheet handling apparatus comprising an overhead conveyor having sheet engaging traveling belts and electromagnets arranged to hold the sheets against the belts, an air deflector box disposed adjacent said overhead conveyor and having longitudinally spaced openings for receiving air adjacent the trailing end thereof and for discharging the air downwardly against the sheets in spaced areas immediately in advance of the trailing end, baffle forming partitions in said box for directing the air from the receiving openings to the discharge openings, a bottom conveyor aligned beneath the overhead conveyor for receiving the sheets released from the overhead conveyor, an air supply device disposed below the path of travel of the sheets and adjacent the entrance end of said bottom conveyor and having means for delivering air upwardly across the path of travel of the sheets and into an air receiving opening in said deflector box whereby to provide an air current which is interrupted by the advance of the sheet, which initially supports the sheet and which thereafter, when the sheet has passed over the air supply device, applies downward pressure to the sheet with the pressure at the trailing end of the sheet being greater than at the forward end of the sheet so as to release the same from the overhead conveyor when current to the electromagnets is cut off and to deposit the sheet on the bottom conveyor with the trailing end thereof falling first.

10. A sheet handling apparatus as recited in claim 9 and a vacuum box having a connection with vacuum producing means disposed in advance of said air deflector box and in the leading end of said overhead conveyor, for assisting the electromagnets in holding the leading ends of the sheets against the belts.

11. A sheet handling apparatus as recited in claim 9 and means associated with the bottom conveyor for providing an air cushion between the bottom surfaces of the sheets and the top surface of the bottom conveyor while the sheets are advanced and released for deposit on the bottom conveyor.

12. In a metal sheet handling apparatus, a bottom conveyor, an overhead magnetic conveyor extending above the bottom conveyor for advancing successive sheets to a position for deposit on the bottom conveyor, an air supply device at the entrance end of the bottom conveyor having means for delivering a stream of air at an upward and forward inclination across the path of travel of the sheets, and means forming a plurality of longitudinally spaced air deflector compartments associated with said overhead conveyor, said compartments each having downwardly opening apertures on the bottom face which are spaced longitudinally of the conveyor with the rearmost aperture being aligned with said air delivering means so as to receive the air stream delivered by said air supply device and the remaining apertures being spaced therefrom along the trailing end of the overhead conveyor in a position to deflect the air so that it strikes the rear marginal portions of each successive sheet and exerts downward pressure on the trailing end which is greater than the downward pressure on the leading end of the sheet when the sheet advances past said air stream thereby to cause the trailing ends of successive sheets to drop before the leading ends of the sheets are released from the overhead conveyor.

13. In metal sheet handling apparatus as recited in claim 12 and said air supply device comprising an air supply tank, means forming a relatively wide shallow air compartment extending horizontally and forwardly of said air supply tank between said conveyors, an elongate cylindrical valve housing at the forward end of said air compartment forming means, said valve housing having upwardly and forwardly inclined apertures spaced along the same for delivering jets of air in an upwardly inclined direction across the path of the sheets, and a valve rod rotatably mounted in said valve housing for opening and closing selectively said apertures.

14. In a metal sheet handling apparatus as recited in claim 12, and said air supply device comprising an air supply tank extending transversely of said conveyors, means forming a relatively wide, shallow air passageway extending horizontally and forwardly of said air supply tank, means forming a transversely extending cylindrical housing at the forward end of said passageway forming means and communicating with said passageway, said housing forming means having forwardly and upwardly inclined air discharge apertures spaced along the same for delivering jets of air forwardly and upwardly across the path of travel of said sheets, a valve rod rotatably mounted in said air housing forming means for opening and closing said air discharge apertures, and a pair of laterally spaced elongate air pipes extending forwardly of said air tank along said bottom conveyor and having air discharge apertures spaced along the same which are inclined forwardly and upwardly so as to provide a cushion of air under the sheets as they advance across the same.

15. A method of handling metal sheets of magnetic material in a processing line which comprises feeding the sheets successively to a horizontally disposed overhead conveyor which advances the sheets by holding the same with magnetic force against the bottom surface of one or more traveling belts, directing a stream of air upwardly toward the overhead conveyor diagonally across the path of advance of the sheets so as to partially support each sheet while it is being held against the traveling belts by magnetic force and advanced across the stream of air, deflecting the stream of air downwardly when the sheet has passed the same, and controlling the volume of air by channeling the air onto segregated areas at the trailing end of the sheet whereby to apply downward pressure on said areas, and discontinuing the magnetic force so as to cause the sheet to be released from the magnetic conveyor with its trailing end forced by the pressure of said deflected air stream on said areas to drop first.

16. A method as recited in claim 15, and applying suction to top surface portions at the leading end of the sheet so as to assist the magnetic force in holding the leading end of the sheet against the traveling belts until the trailing end of the sheet advances across the stream of air and is dropped by pressure of said deflected air stream.

17. A sheet handling apparatus as recited in claim 9, and a pair of elongate air supply pipes extending longitudinally along opposite sides of the bottom conveyor and having longitudinally spaced apertures for directing air upwardly toward the path of travel of the sheets and in the direction of advance of the sheets so as to provide an air cushion between the bottom surface of the sheets and the bottom conveyor.

References Cited in the file of this patent
UNITED STATES PATENTS

| | | |
|---|---|---|
| 2,332,863 | Luehrs | Oct. 26, 1943 |
| 2,897,952 | Buccicone | Aug. 4, 1959 |

UNITED STATES PATENT OFFICE
CERTIFICATE OF CORRECTION

Patent No. 3,161,278                                                 December 15, 1964

Dario Buccicone

It is hereby certified that error appears in the above numbered patent requiring correction and that the said Letters Patent should read as corrected below.

Column 2, line 56, after "end" insert -- when the trailing end --; column 4, line 18, for "belt" read -- belts --; column 5, lines 6 and 8, for "steam", each occurrence, read -- stream --; column 6, line 54, for "sheet" read -- sheets --; column 7, line 31, for "electromagnet" read -- electromagnets --; line 34, for "magnets" read -- magnetic --.

Signed and sealed this 4th day of May 1965.

(SEAL)
Attest:

ERNEST W. SWIDER                                           EDWARD J. BRENNER
Attesting Officer                                               Commissioner of Patents